(12) United States Patent
Sharp et al.

(10) Patent No.: US 6,526,284 B1
(45) Date of Patent: Feb. 25, 2003

(54) TRANSMISSION OF GEOGRAPHIC INFORMATION TO MOBILE DEVICES

(75) Inventors: Christopher Edward Sharp, Winchester (GB); Andrew James Stanford-Clark, Chale (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/510,623

(22) Filed: Feb. 22, 2000

(30) Foreign Application Priority Data

Nov. 10, 1999 (GB) .............................................. 9926492

(51) Int. Cl.$^7$ ................................................ H04Q 7/20
(52) U.S. Cl. ...................... 455/456; 455/457; 342/450; 342/457; 701/208; 340/995
(58) Field of Search ................................ 455/456, 457; 342/450, 457; 701/208, 209, 211, 212; 340/990, 995, 998

(56) References Cited

U.S. PATENT DOCUMENTS 6,246,958 B1 * 6/2001 Hirono ....................... 701/208
6,330,453 B1 * 12/2001 Suzuki et al. ................ 455/456

FOREIGN PATENT DOCUMENTS

EP 0935227 A2 11/1999 ......... G08G/1/0969

* cited by examiner

*Primary Examiner*—Lee Nguyen
(74) *Attorney, Agent, or Firm*—Edward H. Duffield (57) ABSTRACT

Provided is a data transmission method, a communications network, a mobile receiving device and data processing methods for use in broadcast of geographic information to mobile devices. The invention overcomes the problem of lack of currency of static information distribution via CD-ROM, and the problem of the cost of lengthy connections to the Internet which is a requirement of some dynamic solutions. The geographic data which is relevant to a transmitter in the network is broadcast by the transmitter as a plurality of separate data elements which each relate to and include an identification of a specific map segment of a segmented map, such that the data elements can be transmitted independently of each other and the map segment identifier can be used by the receiving device to position the geographic information of each data element within the appropriate map segment. Each data element is retransmitted periodically such that gaps can be filled in and the map can be built up over time even if transmission failures occur during a transmission.

14 Claims, 3 Drawing Sheets

LLoD Byte1 = Map ID, Byte2-3=GridRef, Byte4-5=Icon

Packet1: <UKD1A001>  where A001 =

Packet3: <UKE10D02>
Packet4: <UKF10D02>  where 0D02 =

Packet8: <UKG10005>  where 0005 =

Packet19: <UKD500A1>  where 00A1 =
Packet20: <UKD40FB1>  where 0FB1 =

FIG. 3B

HLoD

Header      Body      Trailer

Packet13: <UKD30003><00431:43541:54351:35561><UKD40003>

Where 00431 = vector (0,0,4,3) within the current square and 1 represents a line.

TRANSMISSION OF GEOGRAPHIC INFORMATION TO MOBILE DEVICES

FIELD OF INVENTION

The present invention relates to the field of data communications, and in particular to the provision of information to a portable or other mobile device such as a mobile telephone, a lap-top or palm-sized data processing device, a data processing system integrated within a vehicle, or any other mobile receiver device.

BACKGROUND

Currently, solutions for providing information for route planning and associated tourist guides are delivered as static databases to work with an application (e.g. Microsoft AutoMap), usually on a CD-ROM. The main disadvantages of such solutions are that the finite space of the storage medium restricts the scale of the information and, being static, the information is inherently dated. The storage capacity issue is being worked on by Matsushita Communication Industrial Co., Ltd. and others, but this and the lack of currency of information remain significant issues especially for supplementary data such as hotel guides and services information which is associated with a map.

Alternative solutions which provide a dynamic solution are typically based on the World Wide Web Internet service. Since the information held on a Web server computer can be updated whenever appropriate, it is possible to ensure that the information accessed by end users via their Web Browsers is current. However, such solutions require the user to either download the pertinent information to their laptop or other portable device before leaving on a journey, or having to browse the information over an expensive dialup service to the Internet during the journey.

UK patent application GB-A-2195868 proposed an alternative solution in which a plurality of transmitters, located in different regions and broadcasting on different frequencies, each broadcast map information relating to their respective regions. Portable receivers are able to receive broadcasts from any of the transmitters and are able to display a map generated from the broadcast information.

Significant problems with the solution suggested in GB-A-2195868, and with many other dynamic solutions, include the problems inherent in currently available wireless communications of potential failures to receive a complete transmission. Such failures may occur for example because the mobile device is temporarily shielded during receipt of a transmission, such as when a user drives into a tunnel, or because the mobile device moves out of the range of the transmitter during receipt of a transmission. Also, the mobile device may be switched off during receipt of a transmission. These problems are emphasized by the typically large amount of geographic information which has to be successfully transmitted in order to give reasonable map detail, since this is relevant to both the likelihood of a failure before transfer is complete and the time required for retransmission.

Matsushita Electric Industrial Co., Ltd. has announced development of a map processing technology which automatically processes maps into a simplified form before they are transmitted to a PDA. The simplified maps have a reduced data size compared with the original maps and so can be transmitted more quickly as well as being easier to read on PDA screens. Although such a solution increases the likelihood of map data being transferred before a communication failure occurs and reduces the transfer time, the Matsushita map reduction solution does not solve the problems of communication failures which occur during a data transfer.

Additional disclosures of map broadcasting solutions which suffer from the above-described problems of communication failures can be found in Japanese patent application JP6229768 (which describes FM broadcasting of map data and uses a position detector, superimposing the vehicle position on a map image generated from the broadcast data) and JP8201085 (which describes a navigation system implementing a method for reducing the requirement for switching of FM broadcasting stations by selecting an optimal FM broadcasting station for a recommended route to a destination). Additionally, French patent application FR2742565 discloses data being broadcast by digital radio and then being filtered on receipt to extract information relevant to the current zone in which a vehicle is located.

SUMMARY OF INVENTION

The present invention provides methods and apparatus for broadcast of geographic information to mobile devices, in which the information is organised for transmission as a plurality of data elements which each relate to and include an identification of a particular segment or region of a map. Positions on the map can be defined with reference to segments or regions. For the purposes of data transmission, the data elements are treated as independent of each other.

"Geographic information" in this context includes map and route information and any information which has a geographic relevance such as weather, traffic and local services information.

The data elements each include a map reference which is sufficient to uniquely locate them in a map. This independent self-identification of map location within each data element ensures that the data elements can be transmitted and received independently of each other and received elements can then be processed at the mobile device to build up a meaningful representation of received geographic information even if one or more of the transmitted data elements is not received. Thus, the present invention is more robust than an "all or nothing" approach to broadcasting of geographic information.

With independence between data elements during transmission, there is no constraint on the order in which data elements are received. A preferred embodiment of the invention broadcasts the geographic data as a data carousel, with each data element being retransmitted periodically (i.e. similar to broadcast of TeleText information). This supports filling in of gaps in a map. Geographic information within a data element for which receipt initially fails but which is successfully received on retransmission can be inserted into the appropriate place in the map.

In a first aspect, the invention provides a method of distribution of geographic information to mobile devices via a wireless communications network, the method including: generating a plurality of data elements to contain the geographic information, each data element relating to and including an identifier of a specific single segment of a segmented map; and broadcasting the data elements via the wireless communications network for receipt by the mobile devices.

In a second aspect, the invention provides a data processing system for generation of data elements containing geographic information, for distribution to mobile devices, the data processing system including a data processing component for separating input geographic information into data components which are each related to a single segment of a map, in accordance with a defined map segmentation, and combining one or more of the data components related to a specific map segment with an identifier of the specific map segment to create a data element.

In a third aspect, the invention provides a wireless data communications network for transmission of geographic information from a first data processing system to mobile devices, the network comprising: a first data processing system including means for generating a plurality of data elements to contain the geographic information, each data element relating to and including an identifier of a specific single segment of a segmented map, and means for distributing the data elements via the network to a plurality of geographically distributed transmitters; and a plurality of transmitters for broadcasting the data elements via wireless communications for receipt by the mobile devices.

In a fourth aspect, the invention provides a mobile data communication and data processing device including: a receiver for receiving wireless broadcast transmissions including receiving data elements which each include geographic information related to a specific single segment of a segmented map and an identifier of said map segment; a memory for storing a representation of the segmented map; a processing component implementing functions to process the map segment identifier of a received data element to determine which segment of a map the geographic information included in the data element relates to, and for adding the geographic information of the data element to the respective segment of the segmented map representation within the mobile data receiver device. The functions implemented by the processing component provide the capability to process a plurality of received data elements which may be received in any order, and to add the geographic information of the received data elements to the respective segments of the segmented map representation to build up a map over time.

In a fifth aspect, the invention provides a method for building a map representation on a mobile communication device, including the steps of: receiving broadcast wireless transmissions including receiving data elements which each include geographic information related to a specific single segment of a segmented map and an identifier of said map segment; storing a representation of the segmented map; processing the map segment identifier of a received data element to determine which segment of a map the geographic information included in the data element relates to; and adding the geographic information of the data element to the respective segment of the segmented map representation within the mobile device.

In the presentation of received data elements, a visual indication may be provided of whether all data elements relevant to a particular map segment have been successfully received, such as by showing incomplete segments in "greyed out" style or with some other visual emphasis. This can be implemented simply, for example by recording at the transmission apparatus how many data elements are relevant to each segment and then checking at the receiving device how many received data elements include the map reference for that segment—where there is a mismatch, the displayed information is greyed out.

In a preferred embodiment of the invention, data is transmitted for receipt by the mobile devices as a plurality of separate broadcast data streams, such as on a plurality of different communication channels. A channel in this context is a particular operating frequency band and associated transmission parameters, or a timeslot within a frequency band). The plurality of channels preferably include a low level of detail (LLoD) channel and one or more high level of detail (HLoD) channels. The data elements sent via the LLoD channel provide a basic map outline and major features, whereas the data elements of the HLoD channels provide finer resolution information supplementary to the LLoD channel. The data elements sent via the LLoD channel typically include only a small number of bytes of information (for example, 5 or 10 bytes). This enables an overall picture to be built up quickly. The HLoD data elements may be considerably larger (for example, 50 bytes), with successful receipt of the HLoD data elements enabling a detailed picture to be built up. Alternatively, the HLoD data elements may be small but the map segment size relevant to their information content may be smaller than for LLoD data elements.

As noted above, in certain embodiments of the invention the geographic data is transmitted as a data carousel with periodic retransmission of each data element. In such an embodiment, the LLoD data elements may be retransmitted more frequently than HLoD data elements, so that there is a higher likelihood of LLoD data elements being received within a time period acceptable to users. This can be independent of whether or not the LLoD and HLoD data elements differ in size or map segment size, but a smaller number or smaller size of data elements on a LLoD channel further improves the likelihood of successful receipt within an acceptable timescale.

According to the preferred embodiment of the invention, when a receiving device starts to receive it will receive data elements related to the local area of its current location, identify the relevant map segments of its internal map structure and start to fill in the segments to build up a map.

In one embodiment of the invention, a receiving device is able to identify when a data element has failed to arrive which is relevant to the map segment in which the receiving device is currently located. For example, this may use GPS or an alternative to determine the location of the receiving device and could use the previously described check of expected numbers of data elements. Alternatively, the check may comprise simply identifying data segments for which no data element has been received. Having identified failure of one or more local data elements, the receiving device concentrates its resources on the communication channel relevant to the missing data element or on the LLoD channel to try to obtain at least the LLoD data element or elements for that segment. It should be noted that a receiving device may receive on multiple channels simultaneously or alternately, and may be receiving from one or a plurality of transmitters.

In addition to each data element including information for identifying the location of the relevant map segment such that data elements can be transmitted as independent elements, the content of each data element is preferably organised into a plurality of independent components. "Independent" in this context does not mean that their information is not related to each other, but rather that the transmission of each component and its interpretation by the receiving device is not dependent on other components.

This embodiment of the invention is preferably implemented by including data component delimiters within the transmitted data stream. If a communication failure occurs, it is then possible to determine which components were successfully received and to process the successfully received components at the mobile device rather than having to treat the whole data element as failed.

The data element components are preferably ordered within a data element such that the more significant components are at the beginning of the data element.

In a further embodiment of the present invention, there is provided a solution combining static provision of geographic information (such as on a CD-ROM or DVD-ROM) with dynamic updates to the static information. Updates since the latest distribution of a static database of geographic information are transmitted as described above and the receiving device superimposes the received update information on the map grid. This involves transmission of significantly less data than if the complete map data is transmitted, while still achieving the currency of local data which is achievable by fully dynamic solutions.

The broadcasting of geographic data according to the invention is preferably a digital wireless broadcast which can be received by any receiver device within the vicinity of a transmitter, but it may also be an interactive broadcast where the receiving devices can influence the content or other characteristics of the broadcast, or a transmission to specific user groups.

BRIEF DESCRIPTION OF DRAWINGS

The invention will now be described in more detail, by way of example, with reference to the accompanying drawings in which:

FIG. 3 is an example representation of map information presented in a grid where each grid segment contains information from independently-transmitted data elements.

DESCRIPTION OF PREFERRED EMBODIMENTS

The present invention may be implemented in a public broadcast network, such as a Digital Audio Broadcasting (DAB) network or a standard analogue FM network such as is currently used for broadcasting the Radio Data Services (RDS) information. A DAB network is preferable because of its higher bandwidth. The invention may also be implemented in any other communications network which includes wireless links to mobile devices (hereafter a "wireless communications network").

Figure 1:
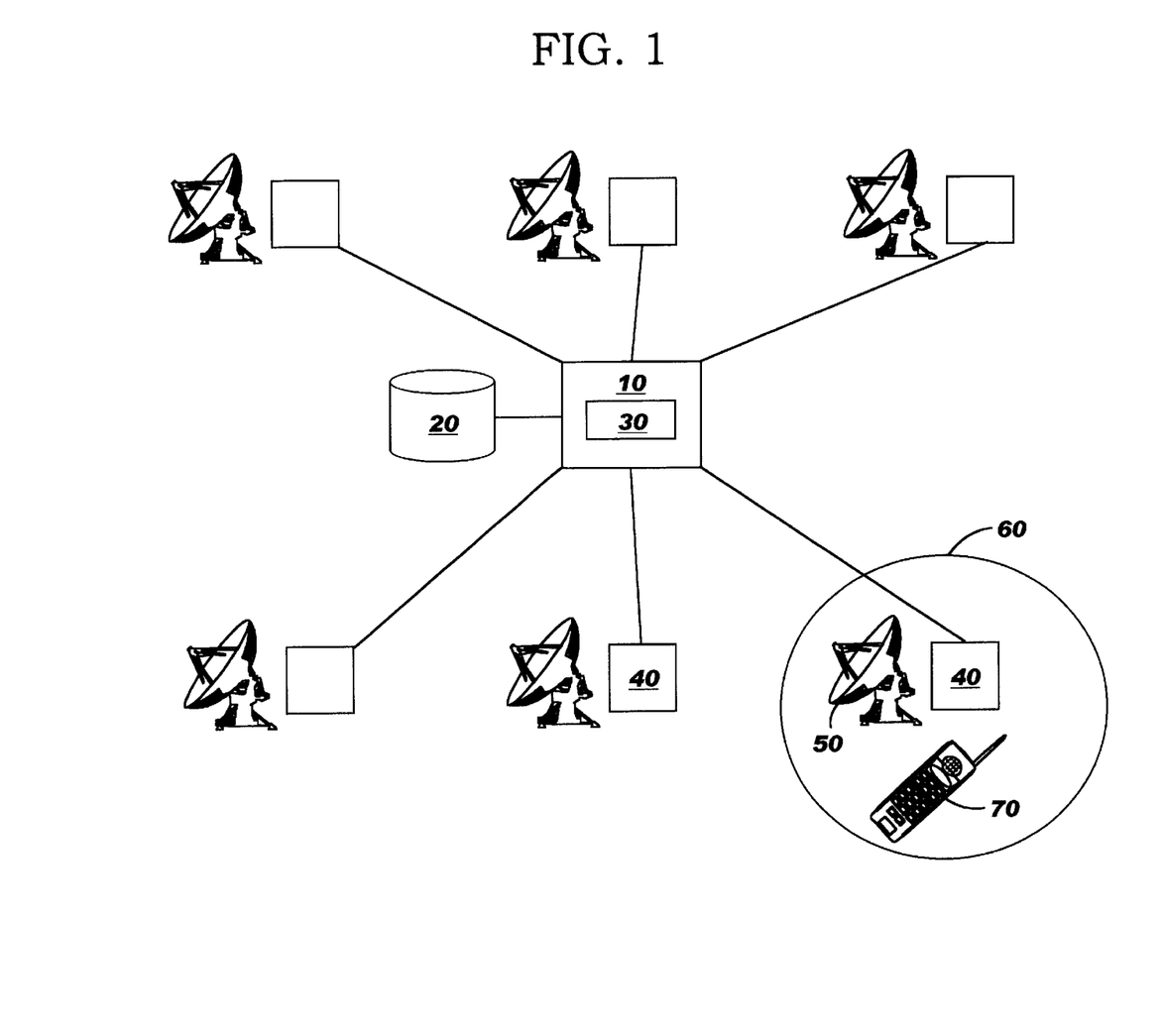
FIG. 1 is a schematic representation of a broadcast network in which the invention may be implemented.

A communications network is shown schematically in FIG. 1, with a central server computer system 10 connected to a number of remote computer systems 40 which are each connected to a transmitter 50. The transmitters 50 broadcast data for receipt by any receiving devices 70 within their respective area of coverage 60. The broadcast network is divided into geographic cells, and these cells overlap to provide overall coverage of a country or region.

The central server computer system 10 is connected to a relational database 20 in which stored data includes geographic information. Map images, weather information, traffic congestion information, hotel guides, local garage services and restaurants are examples of information which for which geographic aspects of the information are important. The geographic information is stored in the database 20 with either explicit geographic coordinates (latitude and longitude or other grid coordinates) or implicit geographic data such as a street address, postal code, etc. The central server 10 has the capability to translate the implicit geographic data into an explicit map location. This conversion is known as geocoding, and Geographic Information Systems (GIS's) having this capability are known in the art.

Data representing well-delineated geographic features can be stored in the database in a vector format, using x,y coordinates to describe two-dimensional data. A road or river can be described as a series of x,y coordinate points. Nonlinear features such as town boundaries can be stored as a closed loop of coordinates. A raster data format can be used for portraying more subtle changes of data between grid cells, such as soil type patterns. Most GIS's make use of both kinds of data. GIS's are known which include a relational database management system (RDBMS) such that queries and analysis can be performed. The results are typically returned in the form of a map. GIS's typically accept geographic input in the form of scanned-in map images, or the input images may have been digitized by the supplying source.

In the GIS according to the present invention, the central server computer system 10 includes a processing and routing component 30 which is responsible for preparing the data in the database for transmission and for routing to each remote computer 40 and its connected transmitter 50 only the data which is relevant to the local geographic area of that transmitter. In view of the complexity and detail of information which may be contained in a GIS, limiting the data sent to each remote computer 40 to only the locally relevant data represents a significant reduction in communication flows and/or enables larger scale map information to be transmitted. In other embodiments of the invention, the filtering of locally relevant data could be performed at the remote computers 40.

Figure 2:
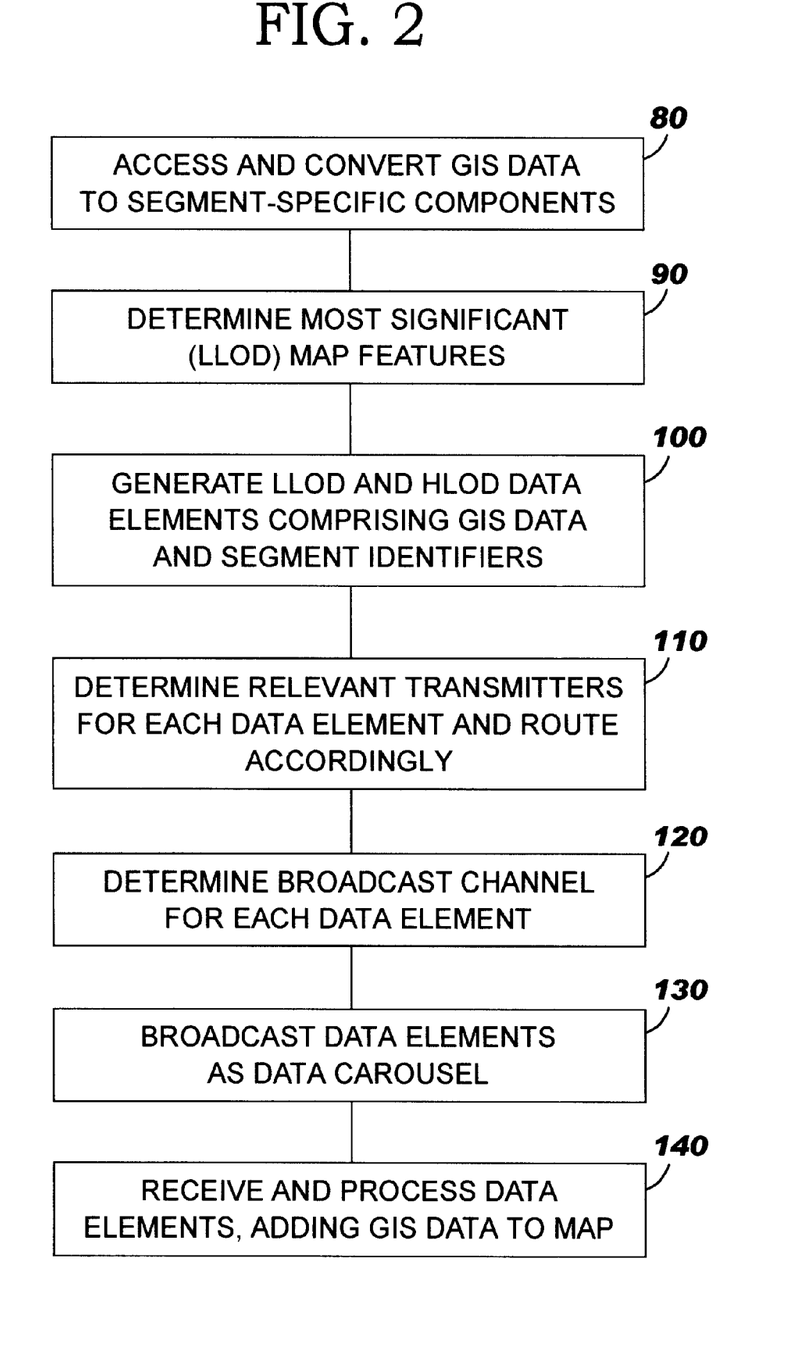
FIG. 2 is a schematic representation of the steps of a method implementing the invention.

These and other steps of a data communications method implementing the present invention will be described below with reference to FIG. 2.

The data in the database 20 may be converted to a geographically segmented format at the time the data is entered in the database. However, a GIS suitable for use in the present invention will typically have additional applications to the specific application of transmission of data to mobile devices and the database may contain non-geographic information, and so it may be unsuitable to impose a segmented data organisation on the database.

Whether performed at data input time or only at transmission time, the processing and routing component 30 accesses geographic data and converts it 80 into a segmented form. For example, any vector which crosses a segment boundary is replaced by a plurality of single-segment vectors starting or ending where the vector meets a segment boundary.

For each segment, the data processing and routing component 30 is also responsible for identifying 90 a set of geographic data components which correspond to the major map features which are fundamental to generate an overview map representation. This set of data components may comprise, for example, locations of towns and cities, major trunk roads, airports, railways, coastline and country borders. In the present embodiment of the invention, this identification of major features is achieved by reference to flags included with the database entries for these data components in the database—i.e. a categorization of database entries is performed when data is added to the database.

This identification of major features is used in the generation 100 of map-segment-specific data elements, since it is relevant to both the sizes of the data elements and the particular communication channels via which the data elements will be transmitted to receiving devices.

A first set of data elements are generated 100 from the geographic data components flagged as corresponding to major map features. These data elements are relatively small (for example, of the order of 5 or 10 bytes of information each). A typical data element of this first set will include a header identifying the data element as a GIS data element, a type identifier and a grid reference which positions the data in a global or regional coordinate system. The type identifier indicates to a remote computer 40 whether the data element contains data components which correspond to major map features. A typical data element of this first set also includes a small number of feature vectors or iconic data components.

The grid reference may be in the form of latitude and longitude coordinates or a simply encoded grid reference which is interpretable by receiving devices. For example, a regional or global map is divided into regions which are numbered or otherwise identified. Each of these regions is then subdivided into segments, each referenced by a coordinate pair which requires only a small number range. In this scheme, an example header has one byte to identify a country or region (giving 256 possible regions), and two bytes to reference a position of a segment within that region, mapping to a 256×256 grid for the region. For example, the grid reference could be "UKD1" to indicate country "UK" and a segment's grid position "D1". The grid reference can be matched with a receiving device's internal map of the world. There may then be as little as two additional bytes of data within a data element to provide an overview iconic representation of the data in the segment using a predefined visual character set. If this data content is encoded, then 65536 geographic features could be represented in the segment.

If the data elements are not fixed in size and are significantly larger than 5 bytes, the header may also include an indication of the data element's size or an identifier of the end of the data element. This indication of the size or end of the data element will be used by a receiving device to determine whether a complete data element was successfully received.

This first set of data elements will be identified on receipt by a remote computer 40, by reference to the GIS identification and type identifiers, and assigned 120 to a low level of detail (LLoD) communication channel of the respective transmitter 50.

Additional sets of data elements are generated 100 from other types of geographic data components. These include sets of data elements containing vectors, iconic data and raster data corresponding to map features which are not flagged in the database as major components, as well as sets of data elements containing supplementary GIS-related information such as tourist information, hospital locations, traffic flow, theme parks, garage services, and any other information which has geographic aspects. Some of this supplementary data may be associated with more than one map segment. The data elements of these additional sets of data elements preferably have a larger size than the first set (typically of the order of 50 bytes) and when sent to a remote computer 40 will be assigned to particular high level of detail (HLoD) transmission channels which are additional to the LLoD channel.

Different HLoD channels may be used for different types of information, and separate HLoD channels may be used for independently broadcasting information for a local area.

The different HLoD channels for different information types may include the following:
   one or more map data channels, via which data elements containing map features other than flagged major features will be transmitted;
   one or more additional information channels for transmitting supplementary information such as traffic flow, weather and local services information (these channels may be specific to an individual publisher organisation or specific to a particular type of information); and
   a directory of services channel which identifies the broadcast channels which are locally available, and which may define the type of information and/or the level of detail (or "granularity of information") available on each of the other channels.

The directory of services channel is useful for enabling a receiving device to automatically find the local channels, and also for an interactive solution where the user is able to control which transmission channels the receiving device will receive on. The directory of services channel thus provides a filtering choice and a service to the receiver to enable it to tune to the locally relevant channels or data streams.

A remote computer 40 which receives a data element will assign 120 the data element to one of these transmission channels after referring to the data type identifier in the header of the data element. Since the transmission channels are dedicated channels, when the data elements are broadcast 130 across the mobile link they do not need to include GIS identification or type identifiers within their headers.

The independence between data elements and the ability to build up a map and fill in gaps regardless of the order in which data elements arrive are especially advantageous in a system which periodically retransmits each data element (a data carousel). If a communication failure occurs during receipt of a particular data element, a partial map can be built from the data elements which are successfully received and then gaps in the map can be filled in if the missing data element is successfully received on retransmission. This is also relevant to the provision of different size HLoD and LLoD data elements (or different numbers of HLoD and LLoD data elements) and separate transmission of the HLoD and LLoD data elements via different channels or data streams. In particular, this enables fundamental Llod data elements to be retransmitted more frequently if desired, thereby further increasing the likelihood of successful receipt of the LLoD data elements.

The data within a data element is organised to achieve independence between the data components within the data element. The purpose of this is to enable a data element to be processed by a receiving device and used in the generation of a map representation even if only part of the data element is successfully received. This is most useful for the larger data elements destined for transmission via HLoD channels, since the likelihood of communication failures during their transmission is greater than for smaller data elements.

A first aspect of the internal organisation of a data element has already been described—the header includes a GIS data element identifier including a data type identifier, a grid reference, and possibly a size identifier. These enable determination of which transmitters the data element should be sent to (as explained later), determination of which channel should be used for transmission to receiver devices, identification by a receiving device of the relevant map segment, and determination by the receiving device of whether the complete data element is received.

The next feature of the internal organisation of a data element, which is relevant to enabling receipt and processing of incomplete information is that data components within a data element are encoded in a progressive manner, with a plurality of independent data components following on from the header. It is possible to receive and process a header and a truncated body of a data element, since each component can then be matched to a map reference in the header, and loss of the "tail end" of a data element does not invalidate the components which were successfully received. If the data element includes a repeat of the map reference at its tail end, then it will also be possible to receive and process the tail end part of a data element comprising at least one data component and the map reference.

In one embodiment of the invention, each data component within a data element has small start and end delimiters. Alternatively, a data type identifier within each data component may be used to determine where data components start and end. A receiving device can then check whether a received data component is complete. If not, the receiving device rejects the incomplete data component, but processes the header and associated complete data components of the respective data element.

The inclusion of an identifier (i.e. the map reference information) at both the start and end of a data element also avoids the potential risk of a break in reception during a header transmission leading to incorrect association between a data component and a previous header. A receiving device that detects a reception error mid-way through receipt of a data element can store subsequently received data components with the intention of associating them with the last known header if this is shown to be valid when the final data element identifier (map reference) is received.

Figure 3A:
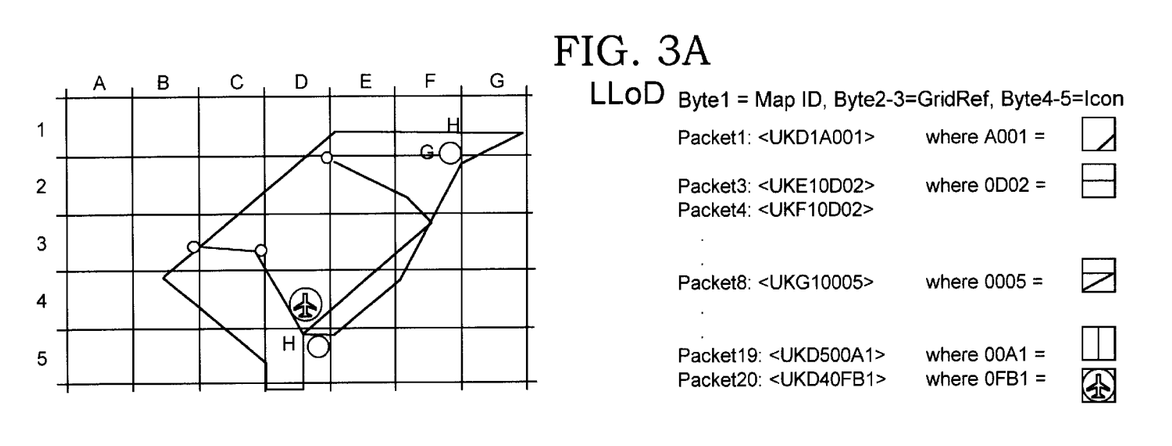
FIG. 3A shows a simplified map with example data elements (packets 1–20) and FIG. 3B shows a more detailed map representable by more complex packets.
Figure 3B:
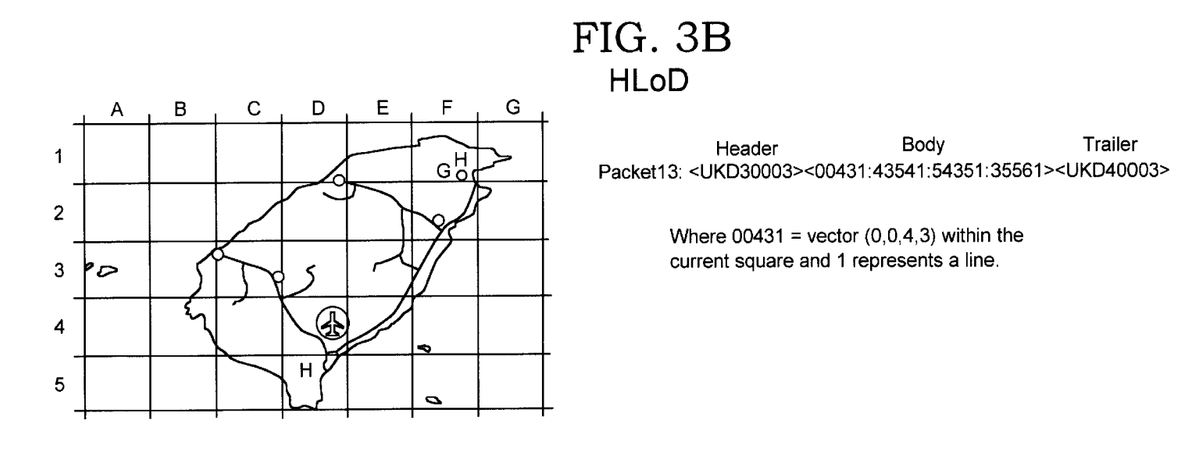

Examples of the content of data elements of both the LLoD and HLoD type are shown in FIGS. 3A and 3B, by way of example, in an embodiment in which the LLoD data elements provide only a simplified overview of the map features within the identified data segment and HLoD data elements provide accurate and detailed information of the major map features and additional information.

FIG. 3A shows an example where the LLoD data elements are generated with the intention of minimizing their size and hence the data content of each data element is a simplified schematic, iconic representation of one feature of each map segment. For example, a first data element (Packet 1) includes only a map reference "UKD1", indicating the map region (UK) and a grid reference (D1) within the region, and a code which is predefined to represent a specific position and orientation line as shown in the Figure. This code may represent just the icon, or it could also indicate background colour attributes. Alternatively, the background colours could be defined in separate data elements. Another data element (not shown) having the same header "UKD1" could have a two byte data component referencing a town symbol at a particular position within the segment (shown at the bottom right corner in the example map). In the example shown, one of the data elements (packet 3) of segment F1 contains the same data component as the single data element (packet 2) of segment E1. As noted previously, two bytes are sufficient to reference one of up to 65536 predefined geographic features using this scheme and so only a small number of bytes are required to provide an overview representation of the map data within a segment.

Note that the generation 100 of data elements such as the simplified data elements represented herein requires a specific processing of GIS data by the processing component 30 which involves firstly segmenting the data, then identifying individual data items within each segment, selecting a set of best match iconic representations for the identified data items from a predefined library of icons, and then generating a data element for each one of these icons.

FIG. 3B shows an example HLoD data element associated with a particular map segment of an accurate map. This data element has a map reference at its beginning and its end and includes a set of vectors defining a road. Since the vectors defining the road are specific to the map segment, they can be represented using few coordinates. A first data component comprises a vector (0,0) to (4,3) and a data type identifier "1" which indicates that the data is a line. Thus, each data component is self-defining as to the type of data item it represents (for example, line=1, circle=2, text string=20, etc) such that very few bytes of data are required to define the specific characteristics of the data item. In addition to the line being defined by its end point coordinates, a circle can be defined by its centre and radius, and so on. Background colour attributes can be defined with reference to vectors where the vector represents a boundary (e.g. blue to right of vector, green to left where the vector is a boundary between forest and lake).

Information defining the location of each transmitter 50 is stored at the central server computer 10. The processing and routing component 30 determines a correspondence between the transmitter locations and map segments, either by reference to a predefined correspondence list or using an algorithm which matches map segments to the estimated geographical coverage of each transmitter. The processing and routing component 30 then determines 110 which map segments' information—which data elements—should be sent to each transmitter based on the determined correspondence. The data elements identified as relevant to send to each transmitter preferably correspond to a somewhat wider set of map segments than the estimated transmission coverage area so as to ensure that sufficient information is received by a receiving device 70 which is near the periphery of a transmitter's coverage area. Therefore, some data segments will be sent to more than one transmitter.

The data processing and routing component 30 then routes 110 the geographic data elements to the relevant transmitters 50 via their associated computers 40, and the transmitters 50 broadcast 130 those received data elements which are relevant to their location.

The receiving device 70 according to the preferred embodiment of the present invention includes a lightweight radio receiver integrated within a PDA, a mobile telephone, a computing device such as a laptop, palm-sized or even smaller computing device, or connected to a data processing apparatus embedded within a vehicle. In general, the receiving device may be any device capable of receiving the segmented geographic data elements, determining their respective positions within a map, and presenting the received data or a subset of the data to a user either on a display screen, in audio format, or otherwise.

The receiving device 70 builds a map representation as follows. Firstly, it receives 140 wireless transmissions on one or more data communication channels (see below), receiving data elements which each include geographic information related to a specific single segment of a segmented map and an identifier of said map segment. The receiving device already has stored a representation of the segmented map, which may be in the form of an empty grid with defined coordinates to be completed by received geographic data, or it may comprise a complete map representation which can be supplemented or modified by received geographic data. The receiving device processes the map segment identifiers of received data elements to determine which segment of a map the geographic information included in each data element relates to, and then adds the geographic information of the data element to the respective segment of the segmented map representation.

A receiving device may be set up to receive 140 transmissions via only a specific set of the channels used to broadcast information, based on the capabilities of the device. Alternatively, a receiving device may receive data via the directory of services channel and determine, either with or without user input, which channels it should use for subsequent information receipt.

Using this system, a user of the receiving device 70 can access detailed, dynamic and current map, travel and other geographic information from anywhere while avoiding the need for long and hence expensive point-to-point connections to an Internet Web site. The invention potentially avoids the need for costly connection equipment as well as saving on service tariffs. The invention also potentially avoids the need for the receiving device to supply explicit information as to its geographic location (for example, by feedback to the transmitter from a GPS device). Such geographic information would be necessary for a Web-based solution in order to determine what information is relevant to the mobile device user's location, but is not required for many implementations of the present invention since the receiving device simply receives locally relevant data from the local transmitter. Fine scale local data could then be selected by an application running on the mobile receiver device.

When a receiving device starts to receive, it would pick up packets relating to the local area, and start to "fill in the gaps" on it's internal map structure. This could be held in non-volatile storage, so that when the device stops receiving or switches off, the current map structure is not lost, and can be added to when reception resumes. If the device starts receiving again in a new geographic area, the packets received will be filling in the gaps in another part of the internal map structure. The application can make intelligent judgements as to when it should delete old map squares due to storage constraints or distance from the information currently being received.

As noted previously, additional embodiments of the invention are possible in which only updates to static information (which has already distributed to receiving devices) is broadcast. This limits the amount of data which has to be segmented for transmission by the processing component 30, the amount of data sent from the central server 10 to the remote computers 40, and the amount of data actually broadcast by transmitters 50 and processed by receiving devices 70. Such a reduction of data flows is advantageous, but is not essential. A user of a mobile device which is capable of operating as a receiver device according to the present invention may be able to determine during use whether the device should receive such updates or not, according to whether the type of information the user wants to access has to be the very latest up-to-date information or not.

Note that the present invention is not incompatible with a mobile device which has the capability to establish two-way connections for access of specifically required information, although the invention has been described above only in relation to receipt of broadcast information. For example, a PDA may include a Web Browser and the capability to send requests to a Web-enabled server (which may be the central server 10). This could be used independently of the present invention or as a mechanism for retrieval of information related to the received broadcast information. Such communication capabilities could also be used for requesting data elements which have been identified as failed during transmission, enhancing the ability of the receiving device to ensure that a complete map of local information or specifically requested geographic information is received. Nevertheless, the broadcasting of information reduces the need for lengthy and expensive Internet connections even in mobile devices that have Internet connectivity capability.

What is claimed is:

1. A method of distribution of geographic information to mobile devices via a wireless communications network, the method including:

generating a plurality of data elements comprising containing the geographic information, each data element relating to and including an identifier of a specific single segment of a segmented map, wherein the plurality of data elements comprise a first set of data elements providing low level of detail (LLoD) geographic information and one or more additional sets of data elements providing high level of detail (HLoD) geographic information; and broadcasting the data elements via the wireless communications network for receipt by the mobile devices, wherein the first set of data elements is broadcast via a first transmission channel and the additional sets of data elements are broadcast via one or more transmission channels separate from the first; and wherein broadcast of each of the LLoD data elements is repeated more frequently than broadcast of each of the HLoD data elements.

2. A method according to claim 1, wherein said generation of a plurality of data elements comprises accessing geographic information within a database, separating the geographic information into data components which are each related to a single segment of a map, in accordance with a defined map segmentation, and combining one or more of the data components related to a specific map segment with the map identifier of the specific map segment to create a data element.

3. A method according to claim 1, wherein the plurality of data elements are broadcast in a sequence which is repeated periodically.

4. A method according to claim 1, wherein the LLoD data elements have a smaller size than the HLoD data elements.

5. A method according to claim 1, wherein the LLoD data elements contain information relating to respective map segments of a first size and the HLoD data elements contain information relating to map segments of a different size.

6. A method according to claim 1, wherein the data elements are broadcast via a plurality of separate communication channels and information identifying the plurality of separate channels is broadcast via a directory channel.

7. A method according to claim 1, wherein at least some of said data elements include a map segment identifier and a plurality of mutually independent data components.

8. A method according to claim 7 wherein said data elements including a plurality of independent data components include said map segment identifier at both the beginning and end of the data element.

9. A method according to claim 1, including transmitting data elements from a central server computer to a plurality of remote computers and then broadcasting the data elements via a wireless link for receipt by mobile devices local to a respective wireless transmitter, wherein the data broadcast via the wireless link comprises only information which is relevant to the location area of the respective wireless transmitter.

10. A wireless data communications network for transmission of geographic information from a first data processing system to mobile devices, the network comprising:

the first data processing system including means for generating a plurality of data elements to comprise contain the geographic information, each data element relating to and including an identifier of a specific single segment of a segmented map, wherein the plurality of data elements comprise a first set of data elements providing low level of detail (LLoD) geographic information and one or more additional sets of data elements providing high level of detail (HLoD) geographic information and means for distributing the data elements via the network to a plurality of geographically distributed transmitters; and a plurality of transmitters for broadcasting the data elements via wireless communications for receipt by the mobile devices, wherein the first set of data elements is broadcast via a first transmission channel and the additional sets of data elements are broadcast via one or more transmission channels separate from the first; and wherein broadcast of each of the LLoD data elements is repeated more frequently than broadcast of each of the HLoD data elements.

11. A wireless data communications network for transmission of geographic information from a first data processing system to mobile devices, the network comprising:

the first data processing system including means for generating a plurality of data elements to contain the geographic information, each data element relating to and including an identifier of a specific single segment of a segmented map, and means for distributing the data elements via the network to a plurality of geographically distributed transmitters; and a plurality of transmitters for broadcasting the data elements via wireless communications for receipt by the mobile devices;

wherein the first data processing system includes:

a data processing component for separating input geographic information into data components which are each related to a single segment of a map, in accordance with a defined map segmentation, wherein the plurality of data elements comprise a first set of data elements providing a low level of detail (LLoD) geographic information and one or more additional sets of data elements providing a high level of detail (HLoD) geographic information and for combining one or more of the data components related to a specific map segment with an identifier of the specific map segment to create a data element;

wherein the plurality of transmitters broadcast the first set of data elements via a first transmission channel and broadcast the additional sets of data elements via one or more transmission channels separate from the first, the plurality of transmitters broadcasting the first set of data elements more frequently than the additional sets of data elements.

12. A data communication and data processing device including:

a receiver for receiving wireless broadcast transmissions including receiving data elements which each include geographic information related to a specific single segment of a segmented map and each include an identifier of said map segment, the receiver being capable of receiving data elements via a plurality of different communication channels;

a memory for storing a representation of the segmented map;

a processing component implementing functions to process the map segment identifier of a received data element to determine which segment of a map the geographic information included in the data element relates to, and for adding the geographic information of the data element to the respective segment of the segmented map representation within the device and for determining for which map segments one or more broadcast data elements have not been received and for controlling the operation of the receiver to receive on the communication channel or channels relevant to the broadcast data elements which have not been received in priority to other communication channels.

13. A device according to claim 12, wherein the functions implemented by the processing component provide the capability to process a plurality of received data elements which may be received in any order, and to add the geographic information of the received data elements to the respective segments of the segmented map representation to build up a map over time.

14. A device according to claim 13 including a display device for displaying a map representation including the received geographical information, wherein the processing component implements functions for determining for which map segments one or more broadcast data elements have not been received, and for controlling the display device to display said segments for which broadcast data elements have not been received with a visual emphasis which is different from other map segments.

* * * * *